Oct. 3, 1933.   H. B. DISKIN ET AL   1,929,163
CABLE STRETCHER
Filed Oct. 15, 1932
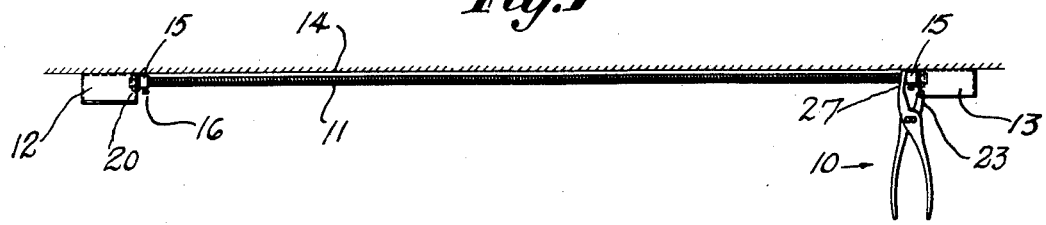
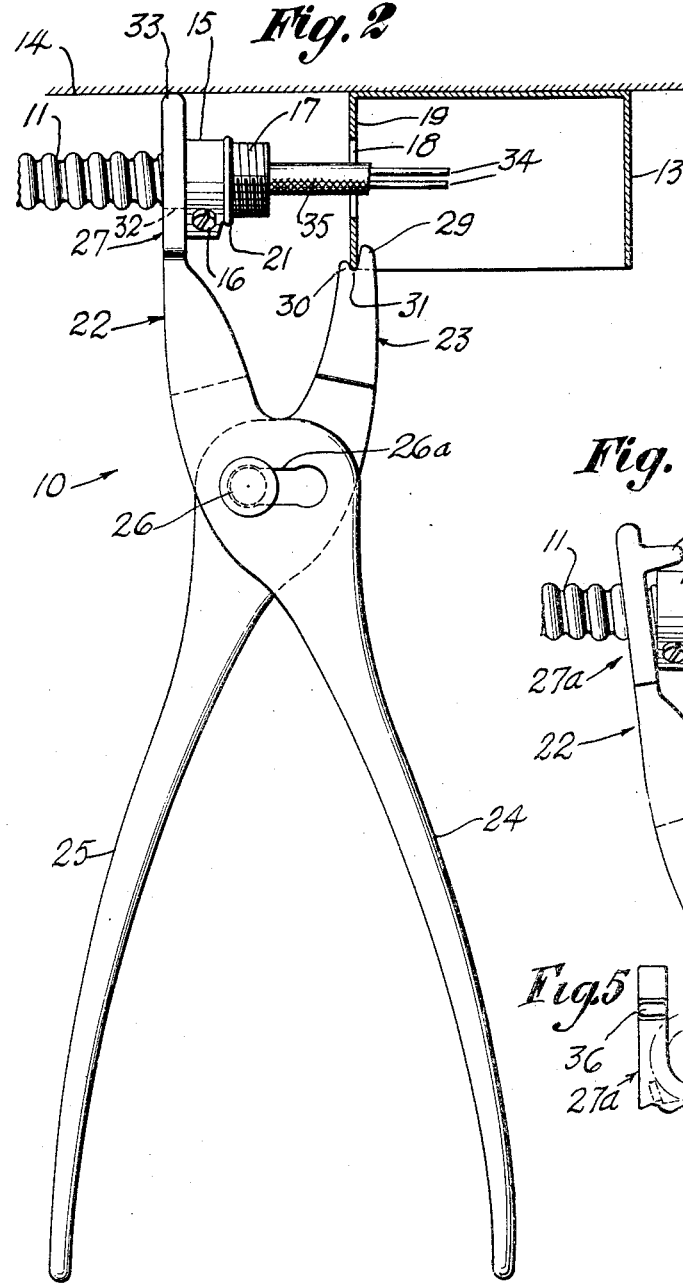
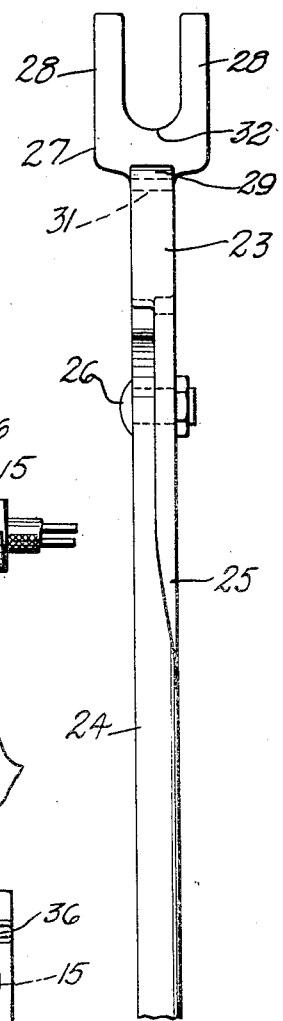
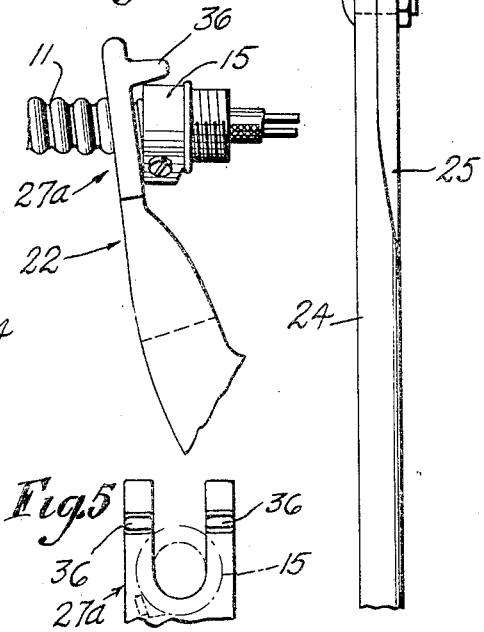

Patented Oct. 3, 1933

1,929,163

UNITED STATES PATENT OFFICE 1,929,163

CABLE STRETCHER

Harry B. Diskin and Philip Frederick,
New York, N. Y.

Application October 15, 1932. Serial No. 637,954

10 Claims. (Cl. 254—77)

This invention relates to cable stretching tools.

One object of the invention is to provide a device of the character described having improved means whereby a cable can be stretched and anchored to an outlet box.

Another object of the invention is to furnish a tool of this nature which can preferably be operated by a single hand, and which comprises few and simple parts, is inexpensive to manufacture, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a diagrammatic view in elevation showing a cable and outlet boxes and a tool embodying the invention applied in connection therewith.

Fig. 2 is an enlarged view in elevation of the tool in applied position, with an outlet box in section.

Fig. 3 is a vertical edge view of the tool.

Fig. 4 is a fragmentary view of a modification of the invention in applied position.

Fig. 5 is a fragmentary view of a jaw member thereof.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

The advantages of the tool may be best understood by a consideration of the problems that it is intended to overcome. In laying electrical cables along ceilings and the like, it is necessary that the cable be tightly stretched so as to prevent sagging thereof. Heretofore it has been extremely difficult to overcome this condition, and where hooks or other fasteners were applied to prevent the sagging, it was frequently necessary to direct the cable in a curve instead of in a straight line, in order to take up the slack in the cable. However, this usually detracts from the appearance of the ceiling.

Moreover, since the cable sheathing frequently possesses a degree of elasticity, the sheathing is cut off at a point less than the distance of the next outlet box, so that the sheathing may be stretched to connect therewith. If sufficiently reduced in length, it will be very difficult to stretch the cable to meet the outlet box, so that the operator must sometimes use both hands for stretching the cable, thus rendering it extremely awkward to engage the cable with the outlet box. Moreover, since the cable must hug the ceiling at all points, use of the hands is very difficult. All of these defects and inconveniences are overcome by this invention.

Referring in detail to the drawing, 10 denotes a device embodying the invention. The same includes a tool for stretching any cable 11 between a pair of usual outlet boxes 12, 13, which are secured to the ceiling 14. Usually a sleeve or bushing 15 takes around each end of the cable and is secured thereto as by a set screw 16. This bushing may have a threaded portion 17 adapted to be extended through an opening 18 in a side wall 19 of the outlet box, and a locknut 20 screwed on the part 17 which projects into the outlet box to hold the cable connected, while a shoulder 21 of the bushing bears on the outside wall of the outlet box around the opening 18. It will be noted that the cable 11 lies quite close to the ceiling 14. Considering that said cable has been previously secured to the outlet box 12, the tool 10 is engaged around the cable so as to bear on the adjacent bushing and force the threaded part thereof into opening 18 of the outlet box 13, to permit a locknut such as 20 to be engaged for effecting the connection.

The tool 10 may include a plurality of interrelatively movable jaws 22, 23, which may be actuated in any suitable manner, as by forming the jaws to constitute portions of the handles 24, 25 respectively which may be crossed and pivotally interengaged at 26. The jaw 22 may have a relatively flat portion 27 extended along a plane parallel to the axis at 26. The portion 27 may be forked so as to have a plurality of fingers 28 for receiving the cable 11. In order to cause said fingers to afford a right angle seat to the bushing 15, in an average position of the tool, the jaw portion 27 may form a suitable angle with its arm 24.

The jaw 23 may have a seating and engaging portion which may include a pair of spaced projections 29, 30, the former of which is of greater length and extends above the latter. These projections cooperate to provide a divergent groove 31 for seating an edge portion of the outlet box while permitting a substantial degree of tilting movement of said jaw.

It will be noted that the end of the jaw 23 terminates at or below the closed inner end 32 of the fork 27.

The several parts of the tool are so associated, that when the jaw 23 is engaged with and rests on the wall of the outlet box, and the cable is seated at the edge 32 of the fork, the bushing 15 is substantially in alinement with the opening 18 of the outlet box. In order to afford a completely balanced position of the tool, the fingers 28 may be of sufficient length to ride along the ceiling, for which purpose the ends of said fingers are rounded at 33. The tool may thus be supported at both jaws. This arrangement has the further advantage that the bushing cannot slip off the fork when the latter is at an oblique angle to the bushing. While the jaws 22, 23 are normally spaced a distance apart, yet in order to afford a still greater spacing of the jaws, a double keyhole slot 26a may be provided along which the pivot pin 26 may be moved to operate at either end of the slot.

The method of using the tool will now be described. The cable or sheathing, which may consist of wound sheet metal and commonly known in the trade as BX cable is cut off so as to be shorter than the distance between the outlet boxes 12, 13. The conductor wires 34 and some of the insulation 35 may be permitted to project from the sheathing. The bushing 15 is then secured to the end of the cable, and the cover of the outlet box 13 being removed, the cable is placed in the fork 27 so that the bushing seats thereagainst, and the jaw 23 applied to the edge of the outlet box. Then upon exerting pressure on the handles 24, 25 with a single hand of the operator, the cable is stretched powerfully and yet easily, causing the bushing to enter opening 18, and while the cable is still so stretched, the locknut 20 is applied on the inside of the outlet box, securing the cable permanently in taut condition and without sag.

In Fig. 4 is shown a modification of the invention, wherein the jaw 22 is provided with a fork 27a which may be similar to that hereinbefore described, except that the prongs of the fork may have parallel toes 36 extending so as to take over the bushing 15 and prevent the same from slipping upward in an oblique position of the jaw 22. Hence it is assured that the bushing will aline with the hole 18 of the outlet box. It will be noted that said toes may be spaced from the ends of the prongs. After the cable is connected to the outlet box, the tool is readily removed by moving the jaw 22 away from the outlet box so that said toes can clear the bushing.

Since the cables and outlet boxes are relatively standard, the device herein described will be found to be of general application.

It will be appreciated that various changes and modifications may be made in the device as shown in the drawing, and that the same is submitted in an illustrative and not in a limiting sense, the scope of the invention being defined in the following claims.

We claim:

1. A cable stretcher including a plurality of pivotally interconnected jaws, one of said jaws having an end fork the prongs of which lie in a plane parallel to the axis of the pivot, whereby said fork is engageable around a cable so as to bear on a bushing connected to the end of the cable, the other jaw terminating below the fork and having an end projection and an adjacent seat on the inner side of the projection whereby said other jaw can be seated on a side wall edge of an outlet box with said projection bearing on the inner surface of the box adjacent to said edge.

2. In combination with an outlet box, a cable, and a bushing on the cable to be connected to said outlet box, of a cable stretcher including a plurality of jaws pivotally movable toward each other, the first jaw having an end fork for receiving the cable and bearing on the bushing, and the second jaw terminating adjacent to the lower end of the fork and having a seat adapted to rest on a side wall edge of the outlet box and a lug for bearing on the inside face of said wall, whereby the cable can be stretched so as to move the bushing into engagement with said wall of the outlet box to be connected thereto.

3. A cable stretcher including a plurality of pivotally interconnected jaws, one of said jaws having means for engaging a side wall edge of an outlet box, said means including a seat and a lug adjacent thereto and extending above the seat, the other jaw having an end fork lying in a plane parallel to the axis of said pivot, said fork being engageable around a cable so as to bear on a bushing connected thereto, the prongs of said fork being of sufficient length and being rounded at their free ends so as to be adapted to ride along the ceiling to which the outlet box is secured.

4. A cable stretcher including a plurality of pivotally interconnected jaws, one of said jaws having an end fork lying in a plane parallel to the axis of the pivot, for engaging around a cable and bearing on the bushing thereof, the other jaw terminating approximately at the lower end of said fork and having a grooved end for receiving a side wall edge of an outlet box, whereby the cable can be stretched toward the outlet box by pivotally moving the jaws toward each other.

5. A cable stretcher including a plurality of pivotally interconnected jaws, one of said jaws having an end fork lying in a plane parallel to the axis of the pivot, for engaging around a cable and bearing on the bushing thereof, the other jaw terminating aproximately at the lower end of said fork and having a plurality of spaced end lugs providing a groove therebetween for engaging a side wall edge of an outlet box, the inner lug being relatively short and the outer lug which engages the inside surface of the side wall being relatively long, whereby the side wall of the outlet box can be engaged at different angles in pivotally moving the jaws for stretching the cable toward the outlet box.

6. A cable stretcher including a plurality of pivotally interconnected jaws, one of said jaws having an end fork lying in a plane parallel to the axis of the pivot, for engaging around a cable and bearing on the bushing thereof, the other jaw terminating approximately at the lower end of said fork and having a plurality of spaced end lugs providing a groove therebetween for engaging a side wall edge of an outlet box, the inner lug being relatively short and the outer lug which engages the inside surface of the side wall being relatively long, whereby the side wall of the outlet box can be engaged at different angles in pivotally moving the jaws for stretching the cable toward the outlet box, and said fork being of sufficient length so that the ends thereof are adapted to rest on and ride along a surface to which the outlet box is connected, during pivotal movement of the jaws.

7. A cable stretcher including a plurality of pivotally interconnected jaws, one of said jaws having an end fork lying in a plane parallel to the axis of the pivot, for engaging around a cable and bearing axially on a bushing thereof, the other jaw having a stepped end for resting on a side wall edge of an outlet box and bearing on the inner surface of said side wall, said jaws being normally spaced from each other to accommodate the bushing, and one of the jaws having a double keyhole slot for the pivot, whereby the jaws can be set at a greater distance apart so as to be adapted to stretch the cable a corresponding distance toward the outlet box.

8. A cable stretcher including a plurality of pivotally interconnected jaws, one of said jaws having a fork lying in a plane parallel to the axis of the pivot for engaging around a cable and bearing on a bushing thereof, the other jaw having means for engaging a side wall of an outlet box, the prongs of said fork having lateral substantially parallel projections extending generally toward the other jaw so as to be adapted to releasably engage over said bushing, and said projections being spaced so as to permit the cable to freely pass therebetween.

9. A cable stretcher including a plurality of pivotally interconnected jaws, one of said jaws having a fork lying in a plane parallel to the axis of the pivot, for receiving a cable and bearing on the bushing thereof, the other jaw terminating below said fork and having means for seating on a side wall edge of an outlet box and bearing on the inner surface of said wall, the fork having prongs of sufficient length to move along a plane surface to which the outlet box is connected, and said prongs having lateral substantially parallel projections extending generally in the direction of the other jaw and spaced from the free ends of said prongs.

10. A cable stretcher including a plurality of pivotally interconnected jaws, one of said jaws having a fork lying in a plane parallel to the axis of the pivot, for receiving a cable and bearing on the bushing thereof, the other jaw terminating below said fork and having groove means with side walls of unequal length for seating on a side wall edge of an outlet box and bearing on the inner surface of said wall, the fork having prongs of sufficient length to move along a plane surface to which the outlet box is connected, and said prongs having lateral substantially parallel projections extending generally in the direction of the other jaw and spaced from the free ends of said prongs.

HARRY B. DISKIN.
PHILIP FREDERICK.